(12) United States Patent
Raikar et al.

(10) Patent No.: US 11,972,770 B2
(45) Date of Patent: *Apr. 30, 2024

(54) SYSTEMS AND METHODS FOR INTELLIGENT PLAYBACK

(71) Applicant: DISH NETWORK TECHNOLOGIES INDIA PRIVATE LIMITED, Bangalore (IN)

(72) Inventors: Yatish Jayant Naik Raikar, Bengaluru (IN); Varunkumar Tripathi, Bengaluru (IN); Karthik Mahabaleshwar Hegde, Uttara Kannada (IN)

(73) Assignee: DISH NETWORK TECHNOLOGIES INDIA PRIVATE LIMITED (IN)

( * ) Notice: Subject to any disclaimer, the term of this patent is extended or adjusted under 35 U.S.C. 154(b) by 200 days.

This patent is subject to a terminal disclaimer.

(21) Appl. No.: 17/668,347

(22) Filed: Feb. 9, 2022

(65) Prior Publication Data
US 2022/0270632 A1   Aug. 25, 2022

Related U.S. Application Data

(63) Continuation of application No. 16/054,910, filed on Aug. 3, 2018, now Pat. No. 11,282,534.

(51) Int. Cl.
*G10L 21/043* (2013.01)
*G10L 21/055* (2013.01)
(Continued)

(52) U.S. Cl.
CPC .......... *G10L 21/043* (2013.01); *G10L 21/055* (2013.01); *G10L 25/48* (2013.01); *H04N 21/4325* (2013.01)

(58) Field of Classification Search
CPC ..... G10L 21/055; G10L 21/043; G10L 25/48; G11B 27/28; G11B 27/005; H04N 21/4325
(Continued)

(56) References Cited

U.S. PATENT DOCUMENTS 7,974,838 B1   7/2011   Lukin et al.
10,339,974 B1  7/2019   Luo et al.
(Continued)

FOREIGN PATENT DOCUMENTS

EP   1763175 A1 *  3/2007  ........... G10L 19/005
EP   2 388 780 A1   11/2011
ES   2377017 T3 *  3/2012  ............. G10L 21/04

OTHER PUBLICATIONS

International Preliminary Report on Patentability received for PCT Patent Application No. PCT/IN2019/050558, mailed on Feb. 18, 2021, 10 pages.
(Continued)

*Primary Examiner* — Qin Zhu
(74) *Attorney, Agent, or Firm* — Kipman Tyler Werking; VLP Law Group LLP

(57) ABSTRACT

Systems and methods for intelligent playback of media content may include an intelligent media playback system that, in response to determining the speech tempo in audio content by measuring syllable density of speech in the audio content, automatically adjusts a playback speed of the audio content as the audio content is being played based on the determined speech tempo. In some embodiments, the system may automatically and dynamically adjust the playback speed to result in a desired target speech tempo. In addition, the system may determine whether to automatically adjust playback speed of the audio content, as the media is being played, based on the detected speech tempo of the speech in the audio content and the determined type of content of media. Such automatic adjustments in playback speed result in more efficient playback of the audio content.

16 Claims, 9 Drawing Sheets

(51) Int. Cl.
  *G10L 25/48*   (2013.01)
  *G11B 27/00*   (2006.01)
  *G11B 27/28*   (2006.01)
  *H04N 21/432*  (2011.01)

(58) Field of Classification Search
  USPC .......................................................... 700/94
  See application file for complete search history.

(56) References Cited

U.S. PATENT DOCUMENTS

| | | |
|---|---|---|
| 10,388,275 B2 | 8/2019 | Kim et al. |
| 10,726,871 B2 * | 7/2020 | Gilson ............... H04N 21/2387 |
| 2002/0010916 A1 * | 1/2002 | Thong ................... H04N 5/278 |
| | | 725/1 |
| 2016/0210997 A1 | 7/2016 | Gilson |
| 2016/0335043 A1 * | 11/2016 | Guyott ................... G06F 3/165 |
| 2018/0115592 A1 | 4/2018 | Samineni et al. |

OTHER PUBLICATIONS

Office Action received for European Patent Application No. 19759442.7, mailed on Mar. 22, 2023, 6 pages.
Communication Relating to the Results of the Partial International Search for PCT/IN2019/050558, mailed on Nov. 14, 2019, 8 pages.
International Search Report and Written Opinion for PCT/IN2019/050558, mailed Jan. 10, 2020, 13 pages.

\* cited by examiner

SYSTEMS AND METHODS FOR INTELLIGENT PLAYBACK

TECHNICAL FIELD

The disclosure relates to delivering media content and, particularly, to intelligent playback of media content.

BRIEF SUMMARY

When audio content containing speech is played, either alone or with video, the speech tempo (or rate of speech) in the audio content is often slower or faster than desired. For example, a user may have limited time in which to listen to the content being played and thus wants to hear it played faster. On the other hand, a user may still be learning the language being spoken, the subject matter may be complex, or the accent or grammar of the speaker may be hard to understand, resulting in a slower speech tempo desired by the user in order to provide more time for interpretation and/or comprehension of the speech. The user may manually increase or decrease the playback speed of the media content to adjust it to result in a desired speech tempo heard by the user while listening to the content being played. However, the user having to manually increase or decrease the playback speed causes disruption in the continuous enjoyment of the content by the user, interrupts the entertainment experience and requires the user to experiment with different playback speeds to get to the desired speech tempo. Also, the speech tempo in the audio content may change as speakers change or the same speaker changes his or her speech tempo. This would cause the user to have to manually adjust the playback speed to result in the desired speech tempo each time the speech tempo changes during playback. Therefore, provided in the present disclosure is an intelligent media playback system that automatically and dynamically adjusts the playback speed to result in a desired target speech tempo.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
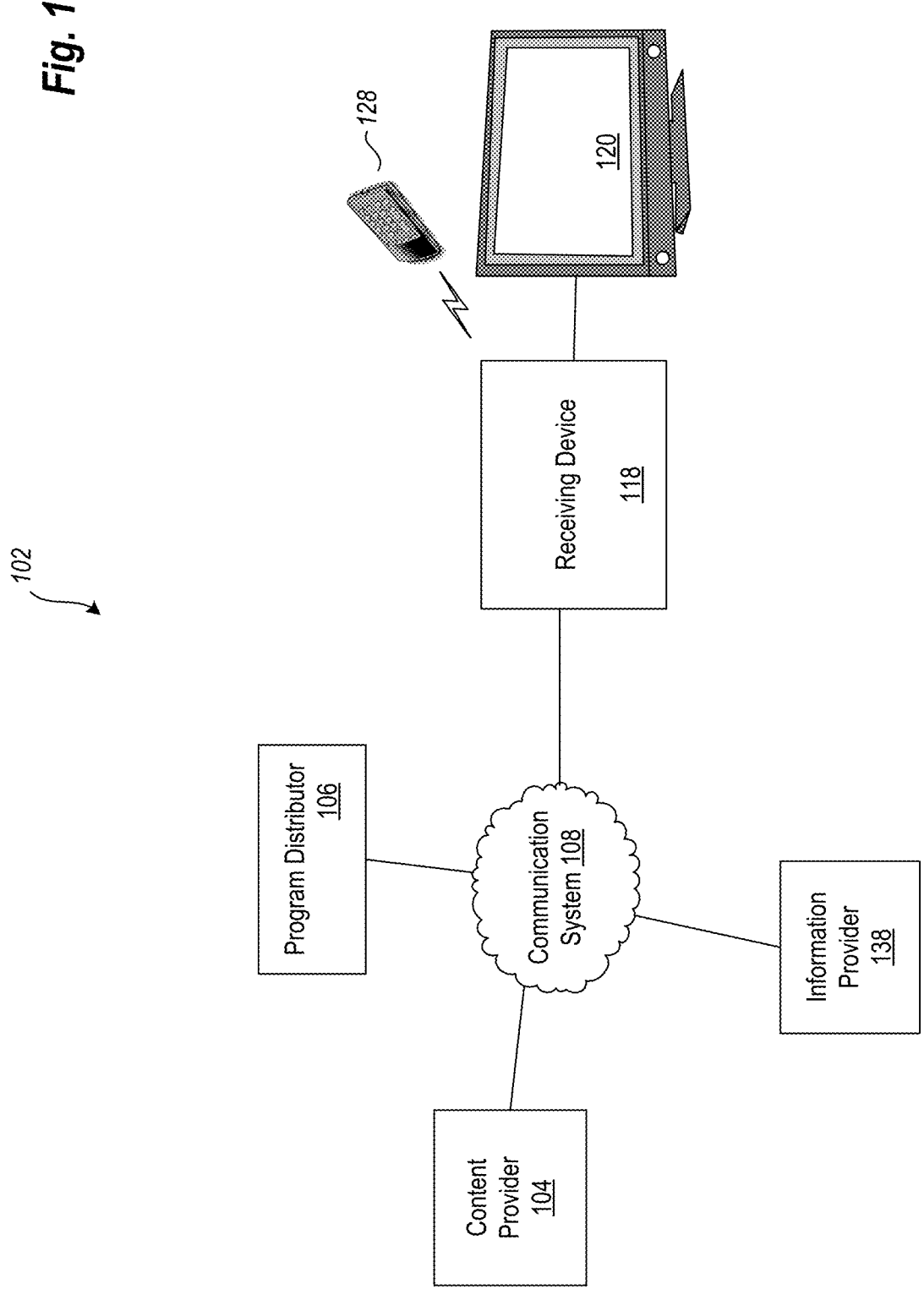
FIG. 1 is a block diagram illustrating an example content distribution environment in which embodiments of intelligent playback of media content may be implemented, according to one example embodiment.

FIG. 1 is an overview block diagram illustrating a content distribution environment 102 in which embodiments of intelligent playback of media content may be implemented, according to one example embodiment.

Before providing additional details regarding the operation and constitution of systems and methods for intelligent playback of media content, the example content distribution environment 102, within which such a receiving device may operate, will be briefly described.

In the content distribution environment 102, audio, video, and/or data service providers, such as television service providers, provide their customers a multitude of video and/or data programming (hereafter, collectively and/or exclusively "programming"). Such programming is often provided by use of a receiving device 118 communicatively coupled directly or indirectly to a presentation device 120 configured to receive the programming. The programming may include any type of media content, including, but not limited to: television shows, news, movies, sporting events, documentaries, advertisements, web videos, media clips, etc. in various formats including, but not limited to: standard definition, high definition, 4 k Ultra High-Definition (HD), Ultra HD (UHD), AVI (Audio Video Interleave), FLV (Flash Video Format), WMV (Windows Media Video), MOV (Apple QuickTime Movie), MP4 (Moving Pictures Expert Group 4), WAV (Waveform Audio File Format), MP3 (Moving Picture Experts Group Layer-3 Audio), WMA (Windows Media Audio), PCM (Pulse-Code Modulation), AIFF (Audio Interchange File Format), AAC (Advanced Audio Coding), LPCM (Linear pulse code modulation), and OGG (Vorbis).

The receiving device 118 may interconnect to one or more communications media, sources or other devices (such as a cable head-end, satellite antenna, telephone company switch, Ethernet portal, off-air antenna, other receiving devices, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, examples of a receiving device 118 may include, but are not limited to, devices such as: a "media player," "streaming media player," "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to play back programming. Further, the receiving device 118 itself may include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 may include, but are not limited to: a television ("TV"), a mobile device, a smartphone, a tablet device, a personal computer ("PC"), a sound system receiver, a digital video recorder ("DVR"), a Digital Video Disc ("DVD") device, game system, or the like. Presentation devices 120 may employ a display, one or more speakers, and/or other output devices to communicate video and/or audio content to a user. In many implementations, one or more presentation devices 120 are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming and special content providers which provide streaming media programming, premium based programming, or pay-per-view programming.

Program content (i.e., a program including or not including advertisements), is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Communication system 108 may include any telecommunications network, computer network, or combination of telecommunications and computer networks that enables applicable communication between the various devices connected to the communication system 108 shown in FIG. 1. For example, a communications network of communication system 108 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, systems shown in FIG. 1 may have various applicable wireless transmitters and receivers and, in the case of using a Wi-Fi wireless link, may also have the corresponding executable Wi-Fi compatible network communications software that initiates, controls, maintains or manages the wireless link between the systems shown in FIG. 1 and the various other devices and systems within or communication system 108 over the Wi-Fi signal of communication system 108.

The communication system 108 may comprise connections to the systems shown in FIG. 1 that provide services to the systems shown in FIG. 1, and may itself represent multiple interconnected networks. For instance, wired and wireless enterprise-wide computer networks, intranets, extranets, and/or the Internet may be included in or comprise a part of communication system 108. Embodiments may include various types of communication networks including other telecommunications networks, cellular networks and other mobile networks. There may be any variety of computers, switching devices, routers, bridges, firewalls, edge devices, multiplexers, phone lines, cables, telecommunications equipment and other devices within communication system 108 and/or in the communications paths between the receiving device 118, program distributor 106, content provider 104 and/or information provider 138. Some or all of such equipment of communication system 108 may be owned, leased or controlled by third-party service providers.

In accordance with an aspect of the disclosure, the receiving device 118, program distributor 106, content provider 104 and/or information provider 138 may contain discrete functional program modules that might make use of an application programming interface (API), or other object, software, firmware and/or hardware, to request services of each other (e.g., streaming media services) and/or one or more of the other entities within or connected to the communication system 108.

For example, communication can be provided over a communications medium, e.g., client and server systems running on any of the receiving device 118, program distributor 106, content provider 104 and/or information provider 138. These client and server systems may be coupled to one another via transmission control protocol/internet protocol (TCP/IP) connection(s) for high-capacity communication. The "client" is a member of a class or group that uses the services (e.g., streaming media services) of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example of FIG. 1, the receiving device 118 may be a client requesting the services of the program distributor 106, content provider 104 and/or information provider 138 acting as server(s). However, any entity in FIG. 1, including the receiving device 118, can be considered a client, a server, or both, depending on the circumstances.

One or more cellular towers and stations may be part of a cellular network that is part of the communication system 108 and may be communicatively linked by one or more communications networks or communication mediums within the communication system 108 (e.g., using a cellular or other wired or wireless signal) in order to facilitate sending and receiving information in the form of synchronous or asynchronous data. This communication may be over a wireless signal on the cellular network of communication system 108 using applicable combinations and layers of telecommunications and networking protocols and standards such as fourth generation broadband cellular network technology (4G), Long Term Evolution (LTE), HTTP and TCP/IP, etc.

Although the physical environment of communication system 108, including the receiving device 118, program distributor 106, content provider 104 and/or information provider 138, may have connected devices such as computers, the physical environment may alternatively have or be described as comprising various digital devices such as smartphones, tablets, personal digital assistants (PDAs), televisions, MP3 players, etc.; software objects such as interfaces, Component Object Model (COM) objects; and the like.

There are a variety of systems, components, and network configurations that may also support distributed computing and/or cloud-computing environments within the communication system 108. For example, computing systems may be connected together within the communication system 108 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the communication system 108.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network such as communication system 108. In a distributed computing environment, program modules may be located in both local and remote memory storage devices.

In at least one embodiment, the received program content is converted by the program distributor 106 into a suitable signal (a "program signal") that is ultimately communicated to the receiving device 118. Other embodiments of the receiving device 118 may receive programming from program distributors 106 and/or directly from content providers 104 via locally broadcast RF signals, cable, fiber optic, Internet media, or the like.

In addition, information provider 138 may provide various forms of content and/or services to various devices. For example, Information provider 138 may also provide information to the receiving device 118 regarding insertion of advertisement or other additional content or metadata into a media content segment (e.g., a program) provided to the receiving device 118. Information provider 138 may also provide metadata regarding the content such as title, genre, program guides, scheduling information, reviews, cast, speech tempo, content type and other information regarding the content. Information provider 138 may provide an electronic program guide or other menu system data or software for a user of the receiving device 118 to organize, navigate and select the available content.

The speech tempo (measured by syllables) in the audio content received by and/or stored on the receiving device 118 may be slower or faster than desired. Syllables are the phonological "building blocks" of words. For example, the word "water" includes two syllables: wa and ter. In particular, speech tempo is a measure of the number of speech units (e.g., syllables) in a given time unit (e.g., each second). Speech tempo may also be referred to as syllable density. In one embodiment, the receiving device 118 may determine the speech tempo of such content by detecting how many syllables are spoken per unit of time or receiving information indicative of how many syllables are spoken per unit of time. This syllable detection may be performed in any combination of hardware or software of the receiving device 118 and, in some embodiments, may be performed remotely, such as by information provider 138. For example, this determination of speech tempo may be performed by the receiving device 118 in real-time while the receiving device 118 is playing the content, or determined before playback. Thus, in some embodiments, information representing the speech tempo may be sent as metadata along with, or otherwise associated with, the content to the receiving device 118 (e.g., via information provider 118) and then stored on the receiving device 118 to be read by the receiving device 118 upon playback of the content. In response to determining the speech tempo of speech in the audio content, the receiving device 118 may automatically adjust the playback speed of the audio content as the audio content is being played by the receiving device 118 based on the determined speech tempo of the speech in the audio content.

The above description of the content distribution environment 102 and the various devices therein, is intended as a broad, non-limiting overview of an example environment in which various embodiments of intelligent playback of media content may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement intelligent playback of media content. Other embodiments of the described techniques may be used for various purposes, including, but not limited to, intelligent playback of media content played on other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
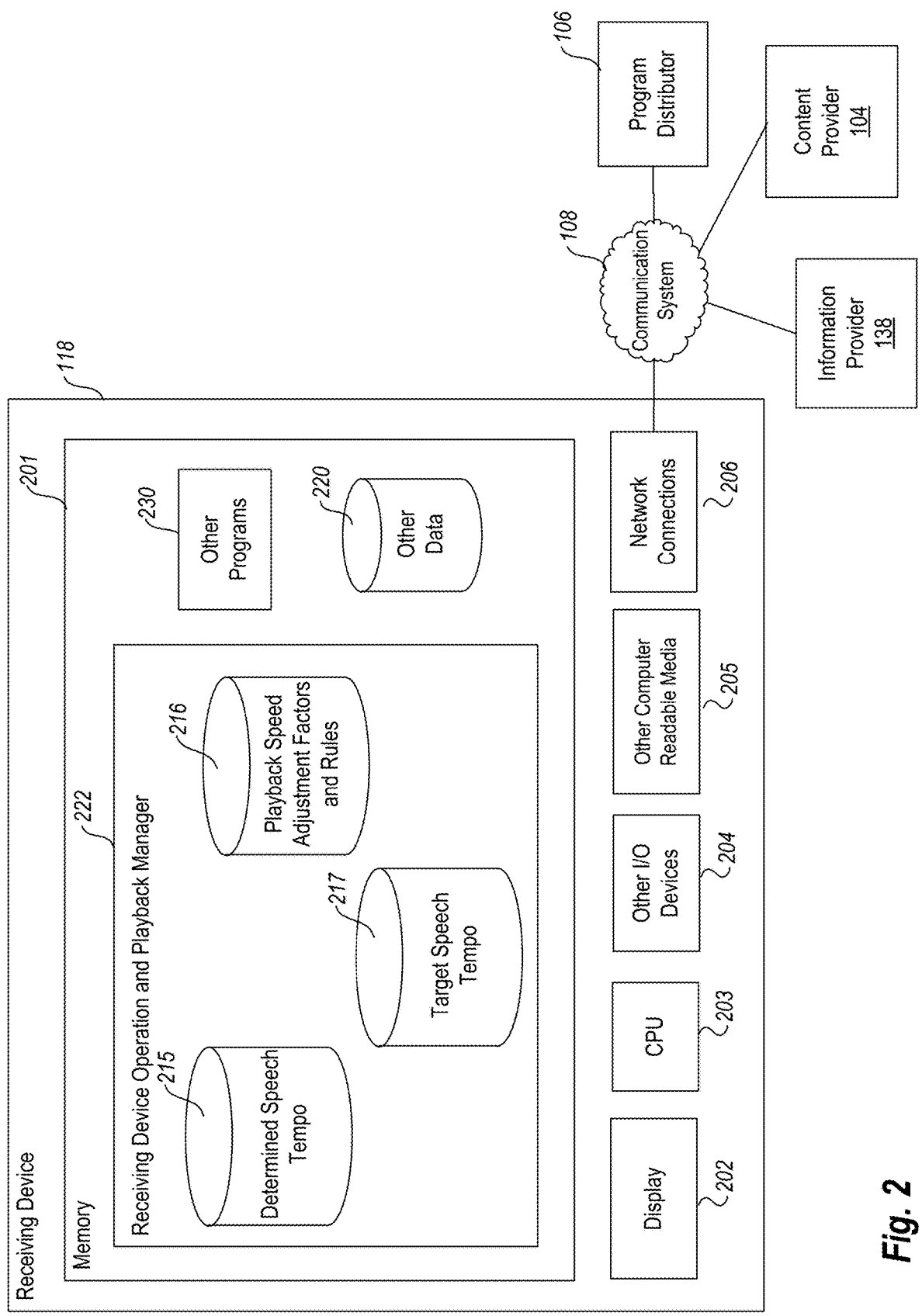
FIG. 2 is a block diagram illustrating elements of an example receiving device used in intelligent playback of media content, according to one example embodiment.

FIG. 2 is a block diagram illustrating elements of an example receiving device 118 used in intelligent playback of media content, according to one example embodiment.

In one embodiment, the receiving device 118 is a device configured to play media content on a presentation device. The receiving device may display programming and/or play audio on a presentation device, such as on a display or speaker. The receiving device 118 may also be configured to receive and record such content from remote sources. In some embodiments, the receiving device 118 is a presentation device, such as a television, smartphone, smart speaker, internet appliance or tablet device, or may be a set-top box or digital video recorder (DVR) device.

Note that one or more general purpose or special purpose computing systems/devices may be used to operate the receiving device 118; receive audio signals representing audio content; determine speech tempo of speech in audio content; automatically adjust a playback speed of the audio content as the audio content is being played based on the determined speech tempo; store information regarding the determined speech tempo; store information regarding playback speed adjustment factors and rules; store information regarding a target speech tempo and/or target speech tempo range; store information regarding the receiving device 118; store program content metadata; and communicate with the program distributor 106, content provider 104 and/or information provider 138. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device operation and playback manager 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., button panel, RF or infrared receiver, light emitting diode (LED) panel, liquid crystal display (LCD), USB ports, digital audio, High-Definition Multimedia Interface (HDMI) ports, other communication ports, and the like), other computer-readable media 205, and network connections 206 (e.g., Wi-Fi interface(s), Bluetooth® interface, short range wireless interface, personal area network interface, Ethernet port(s), and/or other network ports). The presentation device 120 shown in FIG. 1 may be coupled to the receiving device 118 via one or more Input/Output devices 204 and/or network connections 206, such as an HDMI port, Wi-Fi interface and/or Bluetooth® interface, for example.

The receiving device operation and playback manager 222 is shown residing in memory 201. In other embodiments, some portion of the contents and some, or all, of the components of the receiving device operation and playback manager 222 may be stored on and/or transmitted over the other computer-readable media 205. The components of the receiving device 118 and operation manager 222 preferably execute on one or more CPUs 203 and facilitate the receiving, decoding, processing, selecting, recording, playback and displaying of programming content one or more of the various formats described herein.

As described in more detail herein, the receiving device operation and playback manager 222 performs the functionality of the systems and methods for intelligent playback, including, but not limited to: receiving audio signals representing audio content; determining speech tempo of speech in audio content; automatically adjusting the playback speed of the audio content as the audio content is being played based on the determined speech tempo; storing information regarding the determined speech tempo in the determined speech tempo storage 215; storing information regarding playback speed adjustment factors and rules in the playback speed adjustment factors and rules storage 216; storing information regarding target speech tempo and/or target speech tempo ranges in the target speech tempo storage 217; storing information regarding the receiving device 118; storing program content metadata; and, in some embodiments, communicating with the program distributor 106, content provider 104, and/or information provider 138.

For example, the receiving device operation and playback manager 222 may implement the PRAAT program or similar program that can analyze, synthesize, and manipulate data representing speech and may be used to detect the syllable points in the speech represented by audio and measure the syllables per unit of time represented by received audio content. The PRAAT program source code comprises open source software and is publicly available from the Institute of Phonetics Sciences, University of Amsterdam Spuistraat 210 1012VT Amsterdam, The Netherlands. Other available software and/or hardware components that similarly analyze, synthesize, and manipulate data representing speech can also be used to measure the syllables per unit of time represented by the received audio content and may comprise part of the receiving device operation and playback manager 222. Given the detected syllables per unit of time represented by the received audio content, the receiving device operation and playback manager 222 then dynamically adjusts the playback of the audio content based on the detected speech tempo indicated by the detected syllables per unit of time. In various embodiments, the detected syllables per unit of time may be the average detected syllables per unit of time over a period of time of playback of audio content. This period of time may be may be selectable and set by the user via a playback manager or settings menu graphical user interface generated and/or provided by the receiving device operation and playback manager 222.

For example, if a detected current speech tempo falls below a threshold value, the receiving device operation and playback manager 222 may increase the playback speed a percentage of the normal playback speed (e.g., 1.25×, 1.5× or 1.75× the normal playback speed). The normal playback speed of the audio is the default or real-time playback speed of the received audio represented by the received media data without any speed adjustment. Also, if a detected current speech tempo surpasses a threshold value, the receiving device operation and playback manager 222 may decrease the playback speed a percentage of the normal playback speed (e.g., 0.25×, 0.5× or 0.75× the normal playback speed). Other playback speeds may also be used (e.g., 1×, 1.12×, 1.28× and/or 1.4× the normal playback speed, etc.). Such playback speeds may be selected by the user or the system in a manner to have the audio played back with a resulting target speech tempo or within a target speech tempo range. Such a target speech tempo or a target speech tempo range may be selectable and set by the user via a playback manager or settings menu graphical user interface generated and/or provided by the receiving device operation and playback manager 222.

Multiple different threshold levels of detected speech tempo may be associated with and/or cause changing to different corresponding playback speeds. Such threshold levels and other rules regarding playback speed may be stored in the playback speed adjustment factors and rules storage 216. For example, the receiving device operation and playback manager 222 may set the initial playback speed to the normal playback speed (1× the normal playback speed) and then increase the playback speed to 1.12× the normal playback speed when the detected speech tempo is at or falls below a first slow speech threshold (e.g., 4 syllables/per second). The receiving device operation and playback manager 222 may then increase the playback speed to 1.28× the normal playback speed when the detected speech tempo is at or falls below a second slow speech threshold (e.g., 3.5 syllables/per second). The receiving device operation and playback manager 222 may further increase the playback speed to 1.4× the normal playback speed when the detected speech tempo is at or falls below a third slow speech threshold (e.g., 3 syllable/per second). Additional or fewer thresholds may be used in various embodiments. The receiving device operation and playback manager 222 may also have caps set for the minimum and/or maximum playback speed. For example, the minimum playback speed may be capped at 1× the normal playback speed (i.e., the normal playback speed itself) and the maximum playback speed may be capped at 1.4× the normal playback speed. Other cap levels may be used in various embodiments. The payback speed caps, thresholds and corresponding playback speeds may be stored in the playback speed adjustment factors and rules storage 216 and may be selectable and set by the user via a playback manager or settings menu graphical user interface generated and/or provided by the receiving device operation and playback manager 222.

The receiving device operation and playback manager 222 may also apply such playback speed changes for multiple thresholds to decrease the speech tempo in various circumstances. For example, the receiving device operation and playback manager 222 may reduce the playback speed to 0.75× the normal playback speed when the detected speech tempo is at or surpasses a first fast speech threshold (e.g., 6.5 syllables/per second). The receiving device operation and playback manager 222 may change the playback speed to 0.5× the normal playback speed when the detected speech tempo is at or surpasses a second fast speech threshold (e.g., 6.7 syllables/per second). The receiving device operation and playback manager 222 may further change the playback speed to 0.25× the normal playback speed when the detected speech tempo is at or surpasses a third fast speech threshold (e.g., 6.9 syllables/per second). Such playback speeds may be selected by the user or the receiving device operation and playback manager 222 in a manner so as to have the audio played back with a resulting target speech tempo or within a target speech tempo range. Such a target speech tempo or a target speech tempo range may be stored in the target speech tempo storage 217 and may be selectable and set by the user via a playback manager or settings menu graphical user interface generated and/or provided by the receiving device operation and playback manager 222.

In various embodiments, the particular amount of increase or decrease of playback speed may be directly or indirectly related to the detected current speech tempo of the received audio. For example, the increase or decrease of playback speed of the audio may be continuously or near continuously increased or decreased by the receiving device operation and playback manager 222 for each detectable corresponding incremental change in the current speech tempo of the received audio. The relationship between the detected speech tempo and the corresponding increase or decrease of playback speed may be linear, logarithmic, exponential or according to some other function.

Whether to increase, leave the same, or decrease the playback speed and/or the particular amount of increase or decrease of playback speed may also be based on other variables and factors, which may be stored in the playback speed adjustment factors and rules storage 216. For example, for content detected to be sports or music, the receiving device operation and playback manager 222 may set a cap of the playback speed to be no more than 1× the normal playback speed, so as to avoid negatively affecting the artistic or visual aspects specific to music performances and sports contests. For example, such content may be detected before the automatic detection of speech tempo and before any change in playback speed is applied. Such content may be detected based on the receiving device operation and playback manager 222 determining the name of the content, object and/or motion detection in the corresponding video frame(s), the words recognized by the system in the audio sample of the audio content and/or the energy spectrum of the audio sample of the audio content. For example, the receiving device operation and playback manager 222 may compare the object and/or motion detection in the corresponding video frame(s) and/or the energy spectrum of the audio sample of the audio content to stored or otherwise accessible signatures of such objects and/or motion detection and/or energy spectrum measurements associated with music and/or sports content. The receiving device operation and playback manager 222 may also use the detected fundamental frequency of the received audio content to determine playback speed such as to generate smoother transitions across different speech evaluation intervals.

The various factors and variables influencing whether to increase, leave the same or decrease the playback speed and/or influencing the particular amount of increase or decrease of playback speed may be stored in the playback speed adjustment factors and rules storage 216 and may be selectable and adjustable by a user. For example, the receiving device operation and playback manager 222 may provide a graphical user interface menu or other controls enabling the user to select various options and values that affect, set or control the various factors and variables influencing whether to increase, leave the same or decrease the playback speed and/or influencing the particular amount of increase or decrease of playback speed. In one embodiment, such settings selectable by the user may control values affecting various variables and factors, including, but not limited to: the relationship between the detected speech tempo and the corresponding increase or decrease of playback speed; the detected type of content (e.g., sports, music, genre, educational, etc.) on which decisions regarding changes in playback speed are based; the detected motion detection within frames of received video on which decisions regarding changes in playback speed are based; the detected objects within frames of received video on which decisions regarding changes in playback speed are based; and the energy spectrum variables of the audio sample on which decisions regarding changes in playback speed are based.

The receiving device operation and playback manager 222 may also learn which playback speeds and other various factors and variables influencing playback speed as described above are desirable for a particular user or group of users for particular types of content based on previous settings and preferences regarding playback speed set by the user for various different types of content. The receiving device operation and playback manager 222 may then automatically set and apply settings regarding playback speed accordingly for particular types of content and particular users or groups of users based on such learned playback speeds.

As described herein, the receiving device operation and playback manager 222 may interact via the communication system 108 with other devices. For example, the other device may be a home computing system (e.g., a desktop computer, a laptop computer, mobile device, etc.) that includes or has access to (e.g., via communication system 108) the functionality of the program distributor 106, content provider 104 and/or information provider 138.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 includes an application program interface ("API") that provides programmatic access to one or more functions of the receiving device 118 and operation manager 222. For example, such an API may provide a programmatic interface to one or more functions of the receiving device operation and playback manager 222 that may be invoked by one of the other programs 230, program distributor 106, content provider 104 and/or information provider 138, or some other module. In this manner, the API may facilitate the development of third-party software, such as user interfaces, plug-ins, adapters (e.g., for integrating functions of the receiving device operation and playback manager 222 and information provider 138 into desktop and mobile applications), and the like to facilitate adjusting playback speed as described herein on those various connected devices based on the determined speech tempo.

In an example embodiment, components/modules of the receiving device 118 and receiving device operation and playback manager 222 are implemented using standard programming techniques. For example, the receiving device operation and playback manager 222 may be implemented as a "native" executable running on the CPU 203, along with one or more static or dynamic libraries. In other embodiments, the receiving device 118 and receiving device operation and playback manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation and playback manager 222. In one embodiment, instructions cause the CPU 203 or some other processor, such as an I/O controller/processor, to automatically adjust the playback speed of the audio content as the audio content is being played based on the determined speech tempo of the speech in the audio content.

The embodiments described above may also use other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device operation and playback manager 222 implementation. Also, other functions could be implemented and/or performed by each component/module, and in different orders, and by different components/modules, yet still achieve the functions of the receiving device 118 and the receiving device operation and playback manager 222.

In addition, programming interfaces to the data stored as part of the receiving device 118 and receiving device operation and playback manager 222, can be available by standard mechanisms such as through C, C++, C #, and Java APIs; libraries for accessing files, databases, or other data repositories; scripting languages such as XML; or Web servers, FTP servers, or other types of servers providing access to stored data. The determined speech tempo storage 215 and the playback speed adjustment factors and rules storage 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation and playback manager 222.

Furthermore, in some embodiments, some or all of the components of the receiving device 118 and the receiving device operation and playback manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
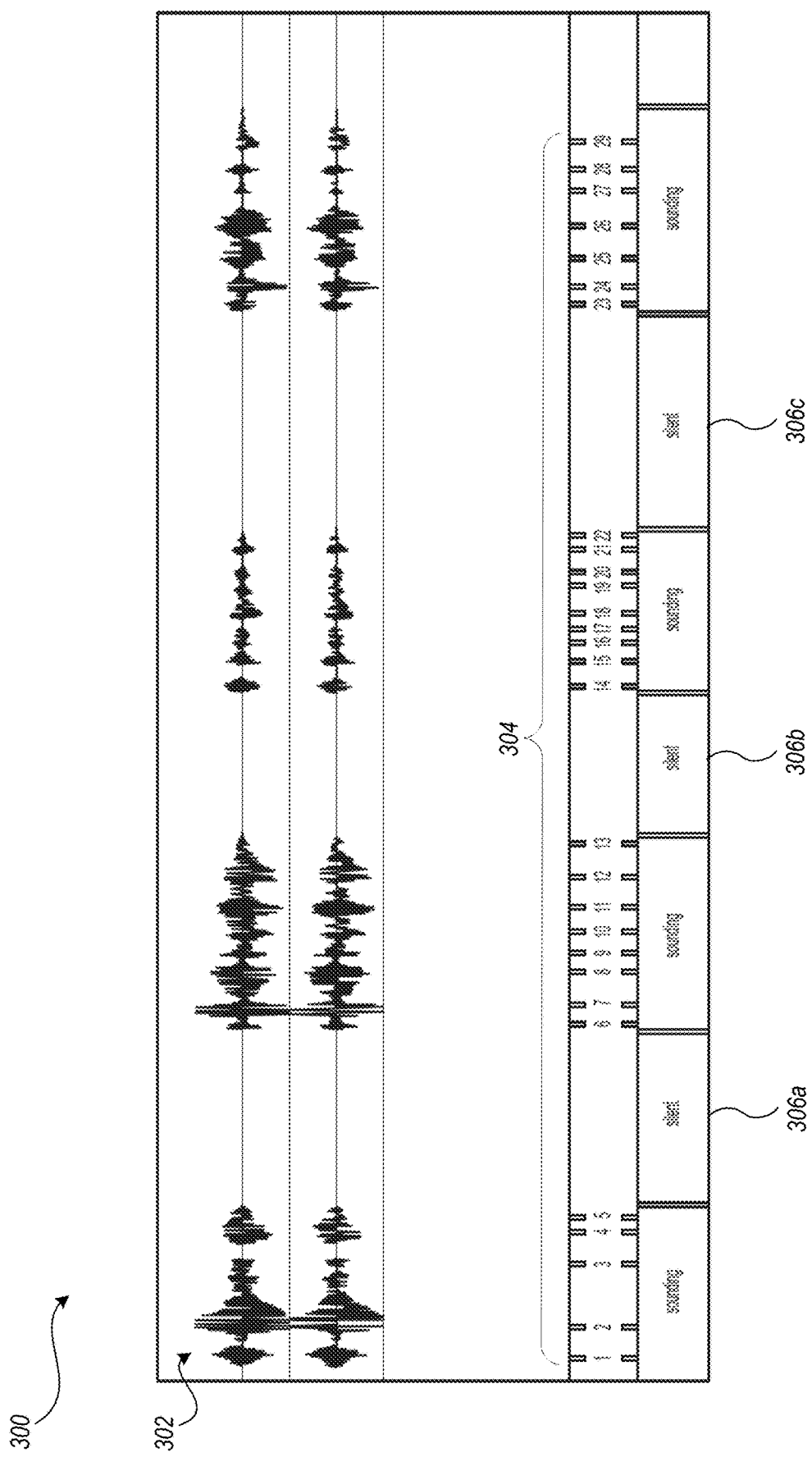
FIG. 3 is a diagram of a representation of syllables being detected in audio content as the audio content is being played, according to one example embodiment.

FIG. 3 is a diagram 300 of a representation of syllables being detected in audio content as the audio content is being played, according to one example embodiment. Shown is a waveform 302 representing the audio being played. The vertical direction represents sound pressure, the horizontal direction represents time. Also shown are a plurality of marks indicating syllable nuclei points 304 detected in the audio waveform 302 by the receiving device 118, each with a number corresponding to the chronological order in which the syllable was detected. For example, the diagram 300 indicates there were 29 syllables detected in the time period shown in the diagram 300 represented in the horizontal direction. In one embodiment, the receiving device operation and playback manager 222 divides the number of detected syllables e.g., 29 syllables) by the number of seconds in the time period shown in the diagram 300 to obtain an average speech tempo per second (i.e., syllable density) for the time period shown in the diagram 300. The receiving device operation and playback manager 222 may then use this average speech tempo (per second) for the time period shown in the diagram 300 to determine whether and how much to adjust the playback speed of the audio to bring the speech tempo of the audio to a desired level. The determination of the speech tempo may be performed in a pre-processing stage before the audio is played back by a particular user, such as by the receiving device 118, program distributor 106, content provider 104 and/or information provider 138 and saved by the receiving device 118 along with or associated with the audio or applicable audio segment in order to apply to the audio or the applicable audio segment when played back by the user. In other embodiments, the determination of the speech tempo may be performed simultaneously or concurrently (or near simultaneously or concurrently) as the audio is being played by the user, in which case, the adjustment to the playback speed will be applied to the next audio segment played after the audio segment for which the speech tempo was determined.

The receiving device operation and playback manager 222 may also detect silent regions or segments (e.g., silent regions 306a, 306b and 306c) detected in the audio waveform 302 representing the audio content. For example, the receiving device operation and playback manager 222 may determine that a silent region is a segment of a particular length that has a speech tempo of zero or when a detected audio level falls below a threshold value. The particular length of detected silence that is to be considered a silent region by the receiving device operation and playback manager 222 may vary in different embodiments and may also be set by the user via a playback manager or settings menu graphical user interface provided by the receiving device operation and playback manager 222. As one example, the receiving device operation and playback manager 222 may determine the playback speed of such silent regions to be the normal playback speed (i.e., 1× the normal playback speed). In other embodiments, the receiving device operation and playback manager 222 may determine the playback speed of such silent regions to be the playback speed of the previous audio segment. In yet other embodiments, the receiving device operation and playback manager 222 may instead determine the playback speed of such silent regions to be the maximum playback speed. The playback speed of the detected silent regions may also be selectable and set by the user via a playback manager or settings menu graphical user interface provided by the receiving device operation and playback manager 222. Any such increase or decrease in playback speed may be performed dynamically by the receiving device operation and playback manager 222 during playback of a media program, segment, or clip.

Figure 4A:
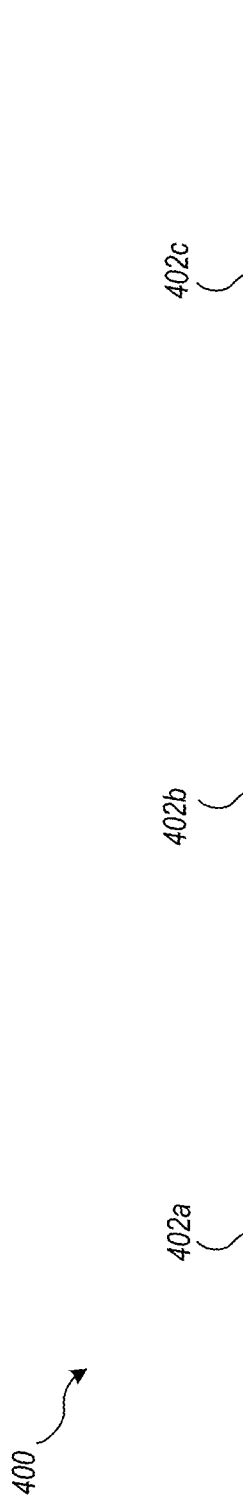
FIG. 4A is a database table illustrating example correlations between detected syllable density in audio content and playback speeds to be applied to increase playback speed in various circumstances, according to one example embodiment.

FIG. 4A is a database table 400 illustrating example correlations between detected syllable density in audio content and playback speeds to be applied to increase playback speed in various circumstances, according to one example embodiment. Shown are possible detected syllable densities 402a (i.e., speech tempo) in syllables per second in the audio content and, for each possible detected syllable density, the correlated playback speed 402b to be applied to the audio content by the receiving device operation and playback manager 222 when encountering that detected syllable density in the audio. Also shown are various factors and rules 402c affecting the determination of playback speed by the receiving device operation and playback manager 222.

For example, when the receiving device operation and playback manager 222 detects that the syllable density of the audio content is 4 syllables per second, the receiving device operation and playback manager 222 will adjust the playback speed to 1.12× normal speed to speed up the speech tempo of the audio for the user. When the receiving device operation and playback manager 222 detect that the syllable density of the audio content is 3.5 syllables per second, the receiving device operation and playback manager 222 will adjust the playback speed to 1.128× normal speed to further speed up the speech tempo of the audio for the user by a greater percentage. When the detected syllable density of the audio falls to 3 syllables per second, the receiving device operation and playback manager 222 will adjust the playback speed to 1.4× normal speed to speed up the speech tempo of the audio for the user by even a greater percentage. In the embodiment shown in FIG. 4A, the maximum playback speed is capped at 1.4× normal playback speed. If a silent region is detected (syllable density of 0), then the receiving device operation and playback manager 222 may adjust the playback speed to normal speed or to the previous playback speed applied. As the determined syllable density increases, the receiving device operation and playback manager 222 will also reduce the playback speed accordingly, as shown in the table 400, with a minimum speed capped at the normal playback speed (1× normal playback speed). The database table 400 may be stored by the receiving device 118 in the playback speed adjustment factors and rules storage 216 or an accessible remote system, such as the program distributor 106, content provider 104 and/or information provider 138.

Figure 4B:
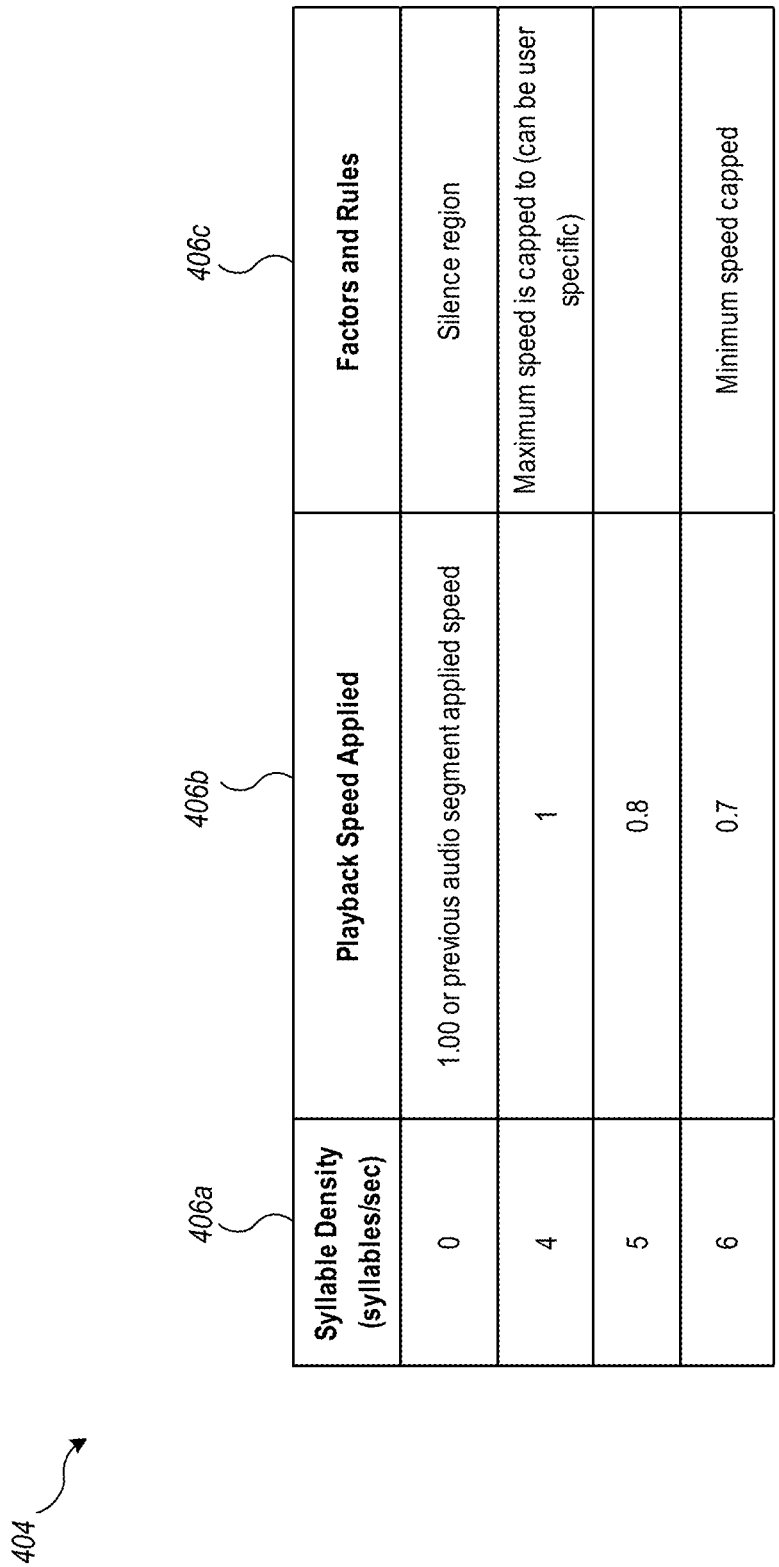
FIG. 4B is a database table illustrating example correlations between detected syllable density in audio content and playback speeds to be applied to decrease playback speed in various circumstances, according to one example embodiment.

FIG. 4B is a database table illustrating example correlations between detected syllable density in audio content and playback speeds to be applied to decrease playback speed in various circumstances, according to one example embodiment. In particular, in various embodiments, the receiving device operation and playback manager 222 may decrease the playback speed to less than normal speed for various corresponding detected syllable densities, such as to slow down the speech tempo to facilitate comprehension or understanding of the speech for the user. Shown are possible detected syllable densities 406a (i.e., speech tempo) in syllables per second in the audio content and, for each possible detected syllable density, the correlated playback speed 406b to be applied to the audio content by the receiving device operation and playback manager 222 when encountering that detected syllable density in the audio. Also shown are various factors and rules 406c affecting the determination of playback speed by the receiving device operation and playback manager 222.

For example, when the receiving device operation and playback manager 222 detects that the syllable density of the audio content is 5 syllables per second, the receiving device operation and playback manager 222 will adjust the playback speed to 0.8× normal speed to slow down the speech tempo of the audio for the user. When the receiving device operation and playback manager 222 detect that the syllable density of the audio content is 6 syllables per second, the receiving device operation and playback manager 222 will adjust the playback speed to 0.7× normal speed to slow the speech tempo of the audio for the user a greater percentage. When the detected syllable density of the audio falls to 4 syllables per second, the receiving device operation and playback manager 222 will adjust the playback speed to normal speed. In the embodiment shown in FIG. 4A, the maximum playback speed is capped at an amount that may be specific to the particular user (e.g., may be capped at normal playback speed or higher than normal playback speed). For example, this amount may be selectable by the user, learned by the system based on previous setting and preferences made by the user or based on a user's familiarity or skill level (e.g., measured by score or skill level rating) regarding the language of the speech in the audio. If a silent region is detected (syllable density of 0), then the receiving device operation and playback manager 222 may adjust the playback speed to normal speed or to the previous playback speed applied. As the determined syllable density decreases, the receiving device operation and playback manager 222 will also increase the playback speed accordingly, as shown in the table 400, with a minimum speed capped at 0.7× the normal playback speed. The minimum playback speed may also be selectable by the user. The database table 404 may be stored by the receiving device 118 in the playback speed adjustment factors and rules storage 216 or an accessible remote system, such as the program distributor 106, content provider 104 and/or information provider 138.

Figure 5:
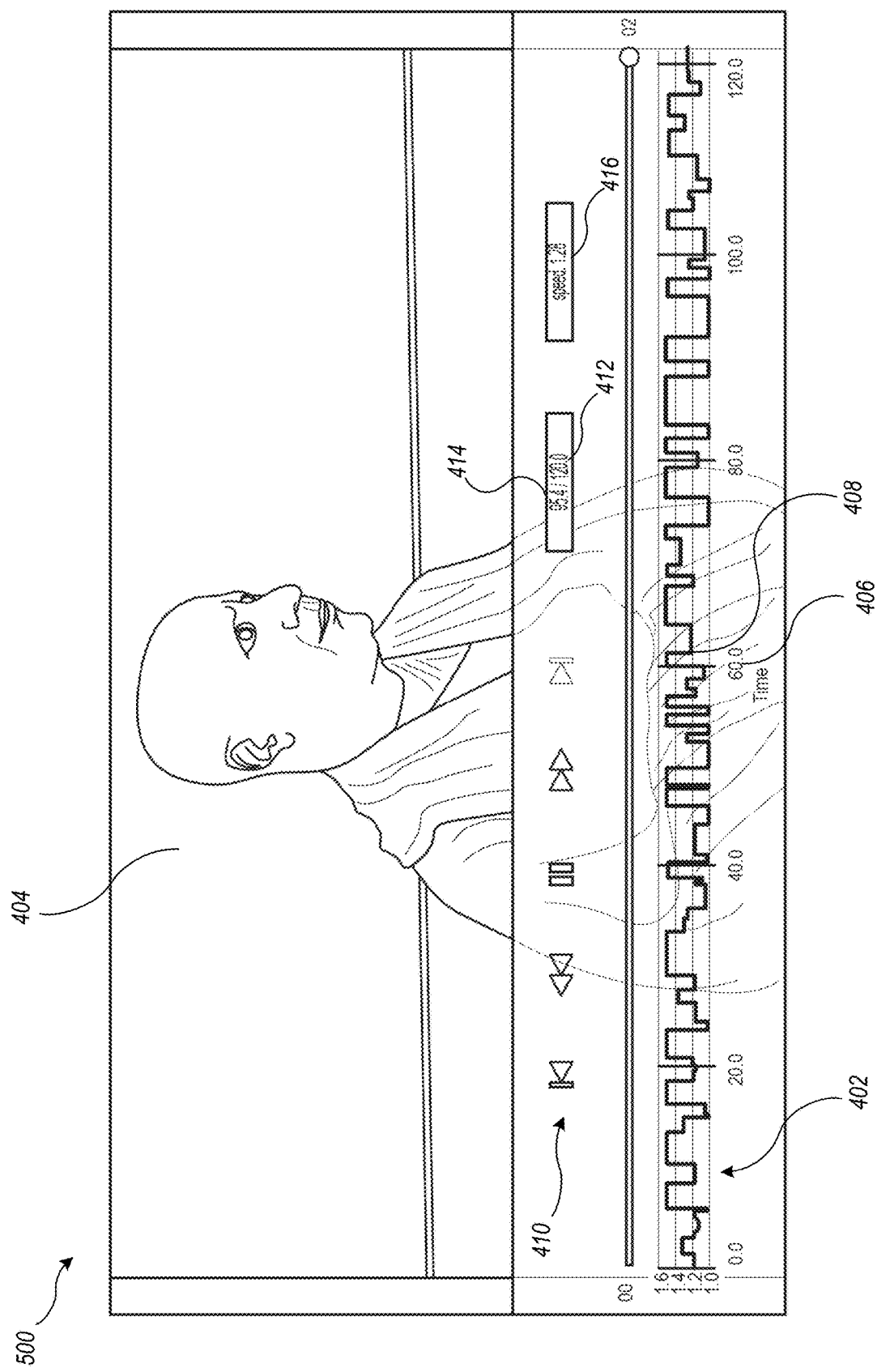
FIG. 5 is an example screenshot of a media player screen and timing chart illustrating automatic adjustments in playback speed of a video as the video is being played by the player based on the determined speech tempo of the speech in the audio content of the video, according to one example embodiment.

FIG. 5 is an example screenshot of a media player screen 500 and timing chart 400 illustrating automatic adjustments in playback speed of a video as the video is being played by the player based on the determined speech tempo of the speech in the audio content of the video, according to one example embodiment. In an example embodiment, the media player may be the receiving device 118 and the media player screen 500 may be generated and/or displayed by the receiving device operation and playback manager 222 on the presentation device 120. The user may initiate the playback of the video 404 by activating the applicable playback control of the playback controls 410 provided by the player. The example video 404 being played shows a person speaking. As the video 404 is being played, the person speaking changes his tempo of speech. As the tempo of speech slows, the playback speed is automatically increased by the receiving device operation and playback manager 222. This is shown in the timing chart 400 with the vertical axis representing playback speed and the horizontal axis representing time. The timing chart 400 illustrates automatic adjustments in time in playback speed of the video 404 as the video is being played based on the determined speech tempo of the speech in the audio content of the video. For example, at the 60 second time point 406, the timing chart 400 shows how the receiving device operation and playback manager 222 increases the playback speed from 1.1× the normal speed to 1.5× the normal speed in response to determining the speech tempo of the person speaking in the video has slowed. Then, in response to determining the speech tempo of the person speaking in the video has sped up again, the timing chart 400 shows how the receiving device operation and playback manager 222 reduces the playback speed at time point 408 to 1.2× the normal speed.

The increase in playback speed at times when the determined speech tempo has slowed results in the user being able to watch, hear and fully understand the video 404 in a total shorter amount of time than playing back the video at normal speed. In particular, the media player screen 500 shows the time taken to play the video 404 was only 95.4 seconds 414, with an average playback speed of 1.28× the normal playback speed 416. However, the video content duration would normally have been 120 seconds 412 played back at normal speed, thus the system described herein provides more efficient playback of the video 404.

Digital media compression may also be performed based on the determined speech tempo of speech in the audio content. Increasing the play rate of the audio content based on the determined speech tempo essentially removes the non-perceptible information in the content. For example, if content is played at an effective (overall) playback speed of 1.2× the normal playback speed, 60 minutes of content is played in only 50 minutes. This results in a savings of 10 minutes (approximately 16%). This information can be used to re-encode the content which can facilitate achieving another 16% savings in the size, which results in faster and/or more efficient transmission of the content. In one embodiment, the receiving device 118 may receive an audio signal representing audio content of the digital media data and then will determine a speech tempo of speech in the audio content. In response to determining the speech tempo of speech in the audio content, the receiving device 118 compresses the digital media data by re-encoding the digital media data content based on the determined speech tempo. In one example, this may be performed by determining downsampling rate to be used based on the determined speech tempo of the speech in the audio content in order to remove non-perceptible information from the audio content of the digital media data. The receiving device 118 then downsamples the audio content at the determined downsampling rate to remove the non-perceptible information from the audio content of the digital media data and re-encodes the downsampled audio content to generate a compressed version of the audio content.

The receiving device 118 may also detect silent regions present in the audio content based on the determined speech tempo of speech in the audio content. The receiving device 118 will then remove the detected silent regions from the audio content of the digital media data and re-encode the digital media data content without the silent regions of the audio. For example, the silent regions may be detected by the receiving device 18 determining that regions in the audio content with a detected speech tempo of zero are silent regions.

Figure 6:
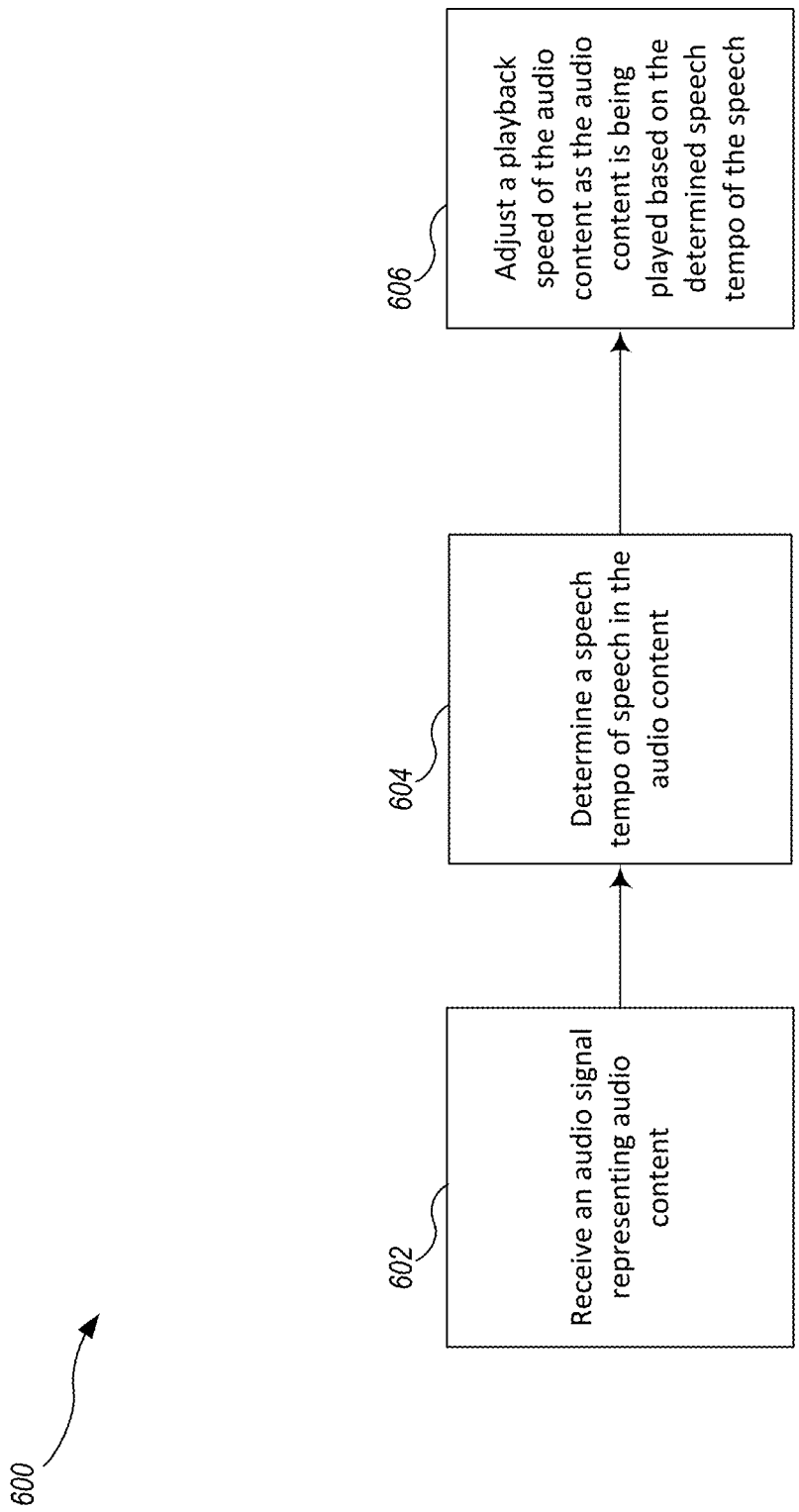
FIG. 6 is a flow diagram of a method of intelligent playback of media content, according to a first example embodiment.

FIG. 6 is a flow diagram of a method 600 of intelligent playback of media content, according to a first example embodiment.

At 602, the receiving device 118 receives an audio signal representing audio content.

At 604, the receiving device 118 determines a speech tempo of speech in the audio content as the audio content is being played.

At 606, the receiving device 118, in response to the determining the speech tempo of speech in the audio content, automatically adjusts a playback speed of the audio content as the audio content is being played. The automatic adjustment of the playback speed of the audio content as the audio content is being played is based on the determined speech tempo of the speech in the audio content.

Figure 7:
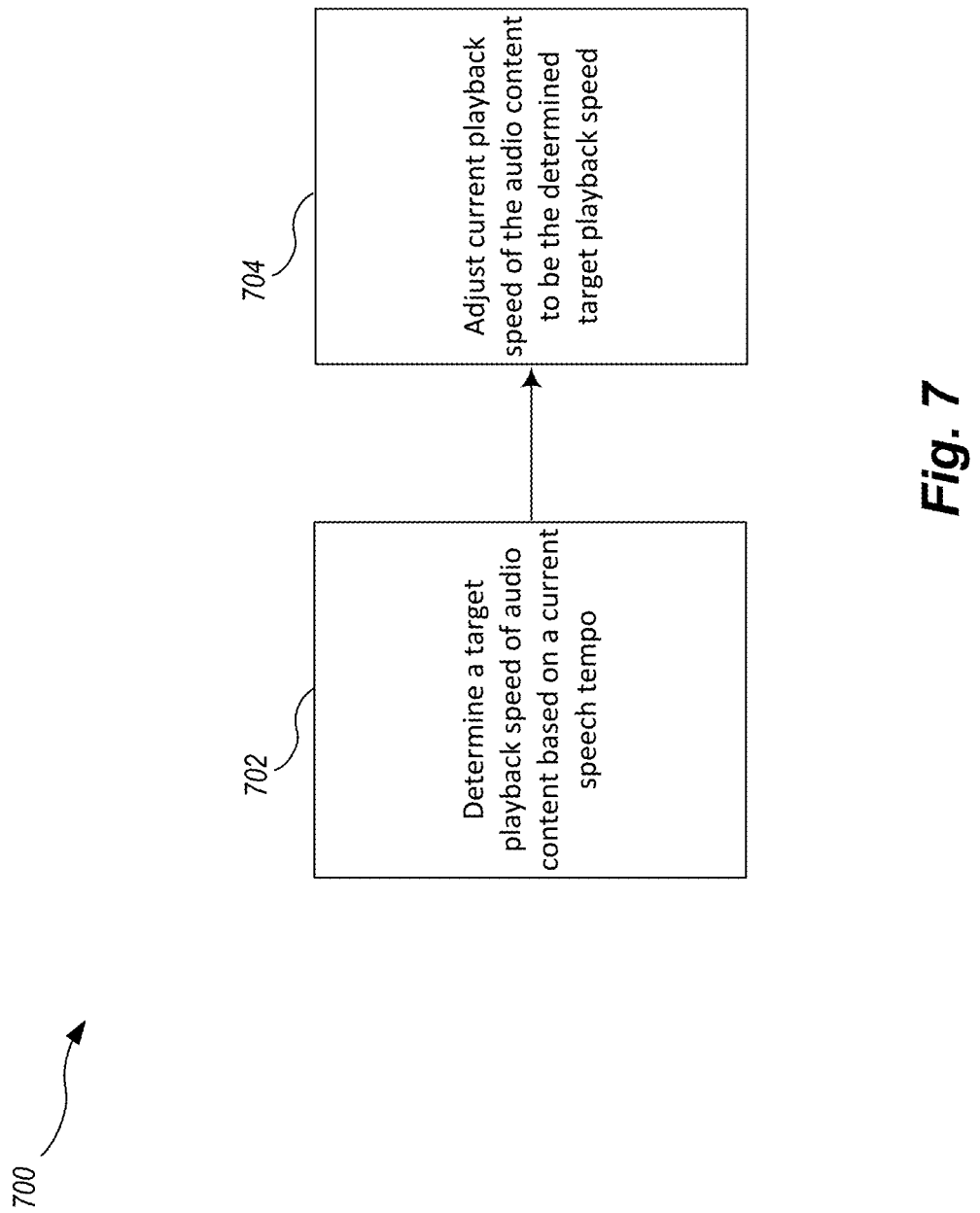
FIG. 7 is a flow diagram of a method of intelligent playback of media content, according to a second example embodiment.

FIG. 7 is a flow diagram of a method 700 of intelligent playback of media content, according to a second example embodiment.

At 702, the receiving device 118 determines a target playback speed of audio content as audio content is being played based on a current speech tempo of speech in the audio content.

At 704, the receiving device 118 automatically adjusts a current playback speed of the audio content as the audio content is being played to be the determined target playback speed. The target playback speed of the audio content as the audio content is being played may be determined additionally based on a target speech tempo or target speech tempo range. For example, the receiving device 118 may adjust the playback speed until a target speech tempo of speech represented by the audio is detected or the target speech tempo of speech represented by the audio is determined to fall within a target speech tempo range.

Figure 8:
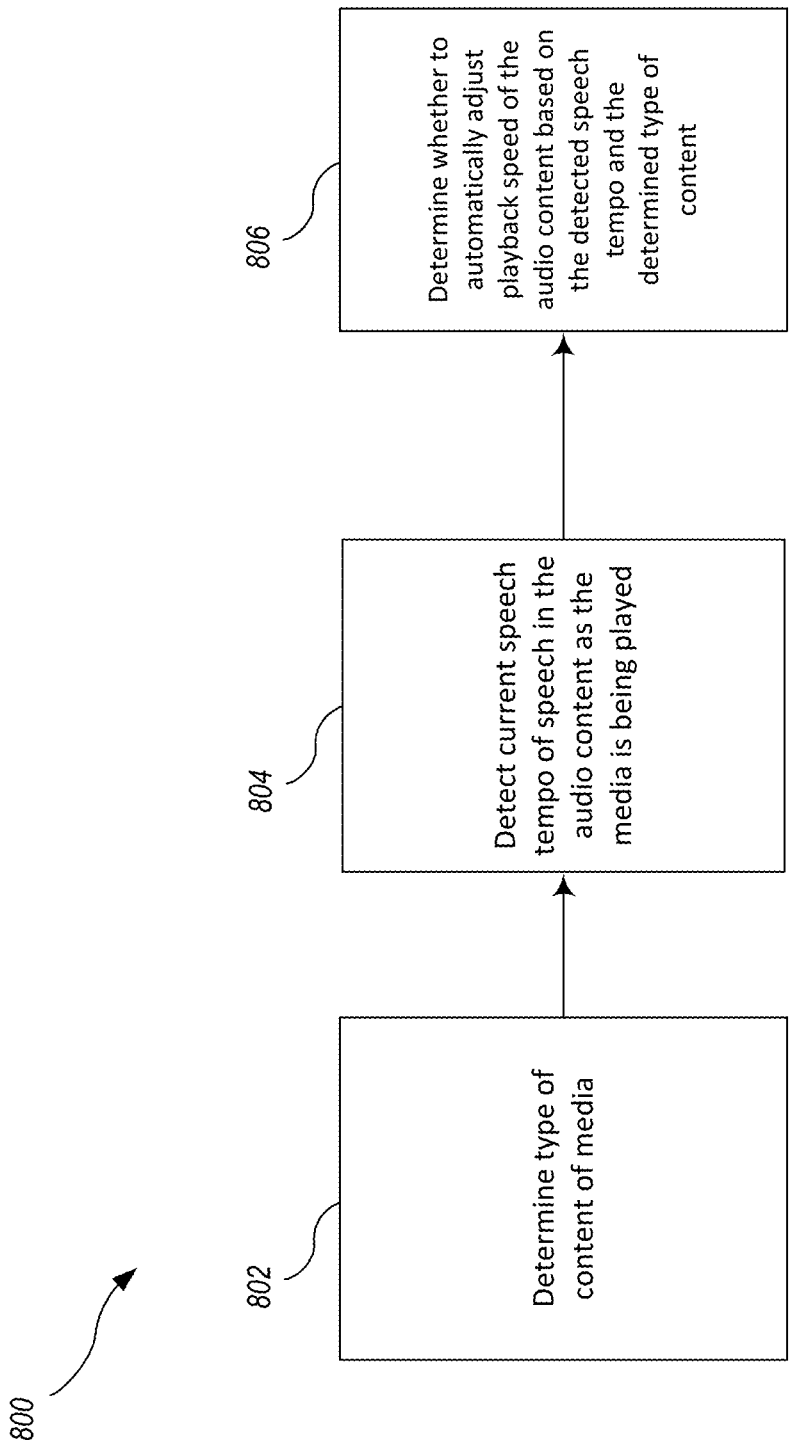
FIG. 8 is a flow diagram of a method of intelligent playback of media content, according to a third example embodiment.

FIG. 8 is a flow diagram of a method 800 of intelligent playback of media content, according to a third example embodiment.

At 802, the receiving device 118 determines a type of content of media that includes audio content (e.g., sports content type, music content type, action sequence type, etc.).

At 804, the receiving device 118 detects a current speech tempo of speech in the audio content as the media is being played.

At 806, the receiving device 118 determines whether to automatically adjust playback speed of the audio content, as the media is being played, based on the detected speech tempo of the speech in the audio content and the determined type of content of media. For example, the receiving device 118 may determine to not automatically adjust playback speed of the audio content as the media is being played in response to a determination that the type of content of media is a sports or music performance. Also, the receiving device 118 may determine that the current speech tempo of speech in the audio content as the media is being played falls above a threshold. The receiving device 118 may then determine to automatically adjust playback speed of the audio content as the media is being played based on the determination that the current speech tempo of speech in the audio content as the media is being played falls above the threshold and a determination that the type of content of media is not sports and is not a music performance.

While various embodiments have been described hereinabove, it is to be appreciated that various changes in form and detail may be made without departing from the spirit and scope of the invention(s) presently or hereafter claimed.

The invention claimed is:

1. A computer-implemented method for compressing digital media data, comprising:
   receiving, by at least one computer processor, an audio signal representing audio content of the digital media data;
   determining, by at least one computer processor, a speech tempo of speech in the audio content, wherein the speech tempo is a measure of a number of syllables of speech in the audio content per unit of time as the audio content is being played; and
   in response to the determining the speech tempo of speech in the audio content, compressing, by at least one computer processor, the digital media data by re-encoding the digital media data content based on the determined speech tempo of the speech in the audio content of the digital media data; and
   automatically adjusting a playback speed of the audio content as the audio content is being played based on the determined speech tempo of the speech in the audio content, wherein the automatically adjusting the playback speed of the audio content as the audio content is being played based on the determined speech tempo of the speech in the audio content includes:
      storing a database including a plurality of selectable playback speeds, each selectable playback speed of the plurality of selectable playback speeds corresponding to a different speech tempo range of a plurality of different speech tempo ranges;
      determining in which speech tempo range of the plurality of different speech tempo ranges the determined speech tempo of speech in the audio content falls;
      selecting the speech tempo range of the plurality of different speech tempo ranges in which the determined speech tempo of speech in the audio content falls; and
      changing the playback speed of the audio content as the audio content is being played to be the selectable playback speed corresponding to the selected speech tempo range of the plurality of different speech tempo ranges;
   wherein:
   the re-encoding of the audio content based on the determined speech tempo of the speech in the audio content of the digital media data includes:
      detecting silent regions present in the audio content based on the determined speech tempo of speech in the audio content;
      removing the detected silent regions from the audio content of the digital media data; and
      re-encoding the digital media data content without the detected silent regions.

2. The method of claim 1, wherein the detecting silent regions present in the audio content based on the determined speech tempo of speech in the audio content includes determining that regions in the audio content with a detected speech tempo of zero are silent regions.

3. The method of claim 1 further comprising:
   receiving by at least one computer processor, a selection of a target speech tempo from a user; and
   changing by at least one computer processor, the playback speed of the audio content as the audio content is being played in to have the audio played back with a resulting target speech tempo of the selected target speech tempo.

4. The method of claim 3 wherein the selection of the target speech tempo from the user is received user via a settings menu graphical user interface generated and provided by a receiving device operation and playback manager generated by the at least one computer processor.

5. The method of claim 3 further comprising:
   continuously determining, by at least one computer processor, whether to increase or decrease playback speed of the audio content as the audio content is being played for each detectable corresponding incremental change in the current speech tempo of the audio content.

6. The method of claim 5 wherein a relationship between the detected speech tempo and a corresponding increase or decrease of playback speed is linear.

7. The method of claim 5 wherein a relationship between the detected speech tempo and a corresponding increase or decrease of playback speed is logarithmic.

8. The method of claim 5 wherein a relationship between the detected speech tempo and a corresponding increase or decrease of playback speed is exponential.

9. A system for compressing digital media data, comprising:
at least one processor; and
at least one memory coupled to the at least one processor, wherein the at least one memory has computer-executable instructions stored thereon that, when executed by the at least one processor, cause operations to be performed including:
receiving, by at least one computer processor, an audio signal representing audio content of the digital media data;
determining, by at least one computer processor, a speech tempo of speech in the audio content, wherein the speech tempo is a measure of a number of syllables of speech in the audio content per unit of time as the audio content is being played;
in response to the determining the speech tempo of speech in the audio content, compressing, by at least one computer processor, the digital media data by re-encoding the digital media data content based on the determined speech tempo of the speech in the audio content of the digital media data; and
automatically adjusting a playback speed of the audio content as the audio content is being played based on the determined speech tempo of the speech in the audio content, wherein the automatically adjusting the playback speed of the audio content as the audio content is being played based on the determined speech tempo of the speech in the audio content includes:
storing a database including a plurality of selectable playback speeds, each selectable playback speed of the plurality of selectable playback speeds corresponding to a different speech tempo range of a plurality of different speech tempo ranges;
determining in which speech tempo range of the plurality of different speech tempo ranges the determined speech tempo of speech in the audio content falls;
selecting the speech tempo range of the plurality of different speech tempo ranges in which the determined speech tempo of speech in the audio content falls; and
changing the playback speed of the audio content as the audio content is being played to be the selectable playback speed corresponding to the selected speech tempo range of the plurality of different speech tempo ranges;
wherein:
the re-encoding of the audio content based on the determined speech tempo of the speech in the audio content of the digital media data includes:
detecting silent regions present in the audio content based on the determined speech tempo of speech in the audio content;
removing the detected silent regions from the audio content of the digital media data; and
re-encoding the digital media data content without the detected silent regions.

10. The system of claim 9, wherein the detecting silent regions present in the audio content based on the determined speech tempo of speech in the audio content includes determining that regions in the audio content with a detected speech tempo of zero are silent regions.

11. The system of claim 9 wherein the computer-executable instructions, when executed by the at least one processor, further cause operations to be performed including:
receiving by at least one computer processor, a selection of a target speech tempo from a user; and
changing by at least one computer processor, the playback speed of the audio content as the audio content is being played in to have the audio played back with a resulting target speech tempo of the selected target speech tempo.

12. The system of claim 11 wherein the selection of the target speech tempo from the user is received-use-F via a settings menu graphical user interface generated and provided by a receiving device operation and playback manager generated by the at least one computer processor.

13. The system of claim 11 wherein the computer-executable instructions, when executed by the at least one processor, further cause operations to be performed including:
continuously determining, by at least one computer processor, whether to increase or decrease playback speed of the audio content as the audio content is being played for each detectable corresponding incremental change in the current speech tempo of the audio content.

14. The system of claim 13 wherein a relationship between the detected speech tempo and a corresponding increase or decrease of playback speed is linear.

15. The system of claim 13 wherein a relationship between the detected speech tempo and a corresponding increase or decrease of playback speed is logarithmic.

16. The system of claim 13 wherein a relationship between the detected speech tempo and a corresponding increase or decrease of playback speed is exponential.

* * * * *